US009551449B2

(12) United States Patent
Kiest, Jr.

(10) Patent No.: US 9,551,449 B2
(45) Date of Patent: Jan. 24, 2017

(54) METHOD FOR CREATING A SEAL BETWEEN PIPE LINERS

(75) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

(21) Appl. No.: 13/115,194

(22) Filed: May 25, 2011

(65) Prior Publication Data

US 2011/0290359 A1    Dec. 1, 2011

Related U.S. Application Data

(60) Provisional application No. 61/348,464, filed on May 26, 2010.

(51) Int. Cl.
*F16L 55/16*   (2006.01)
*F16L 55/165*  (2006.01)

(52) U.S. Cl.
CPC .......... *F16L 55/1656* (2013.01); *F16L 55/165* (2013.01)

(58) Field of Classification Search
CPC ........ F16L 55/18; F16L 55/162; F16L 55/163; F16L 55/179; F16L 55/1651
USPC .................................................... 138/98, 97
See application file for complete search history.

(56) References Cited

U.S. PATENT DOCUMENTS

| 2,500,601 | A | * | 3/1950 | Butler, Jr. ........................ 138/97 |
| 2,829,675 | A | * | 4/1958 | Mueller et al. ................. 138/97 |
| 4,277,091 | A | * | 7/1981 | Hunter ............................ 285/55 |
| 4,602,659 | A | * | 7/1986 | Parkyn, Sr. ..................... 138/98 |
| 4,887,848 | A | * | 12/1989 | Burba ............................. 285/55 |
| 5,322,653 | A | * | 6/1994 | Muller ............................ 264/35 |
| 5,351,720 | A | * | 10/1994 | Maimets ......................... 138/98 |
| 5,368,075 | A | * | 11/1994 | Baro et al. ...................... 138/98 |
| 6,227,764 | B1 | * | 5/2001 | Einhaus et al. ............... 405/157 |
| 6,463,960 | B1 | * | 10/2002 | Madhani et al. ............... 138/98 |
| 6,484,757 | B1 | * | 11/2002 | Warren ........................... 138/98 |
| 6,554,539 | B1 | * | 4/2003 | Radlinger et al. ......... 405/184.2 |
| 6,631,760 | B2 | | 10/2003 | Cook et al. |
| 6,682,668 | B1 | * | 1/2004 | Driver et al. ................... 264/35 |
| 6,692,039 | B2 | * | 2/2004 | Topf, Jr. ........................ 285/370 |
| 6,705,801 | B1 | * | 3/2004 | Kiest, Jr. .................... 405/184.1 |
| 6,899,138 | B2 | * | 5/2005 | Lundman ........................ 138/93 |
| 6,994,118 | B2 | * | 2/2006 | Kiest et al. ..................... 138/98 |
| 7,051,766 | B2 | * | 5/2006 | Kamiyama et al. ............ 138/98 |
| 7,896,032 | B2 | * | 3/2011 | Kiest, Jr. ......................... 138/98 |
| 7,987,873 | B2 | * | 8/2011 | Kiest, Jr. ......................... 138/98 |
| 8,172,482 | B2 | * | 5/2012 | Kiest, Jr. .................... 405/184.1 |

(Continued)

FOREIGN PATENT DOCUMENTS

| CA | 2029144 A1 | 4/1991 |
| DE | 101 09 415 A1 | 9/2002 |

*Primary Examiner* — Paul R Durand
*Assistant Examiner* — Vishal Pancholi
(74) *Attorney, Agent, or Firm* — Nyemaster Goode, P.C.

(57) ABSTRACT

A method of providing a seal between pipe liners in a pipe, or at the juncture between a main and lateral pipe is provided. A first liner, which has been impregnated or otherwise coated with a resinous material capable of curing and hardening, is positioned in a pipe about an area in need of repair. A second liner, also including the resinous material, is place in the same pipe, with a portion of the second liner overlapping a portion of the first liner. A sealing member, such as a hydrophilic or hydrophobic band or material, is placed between the two liners at the overlap to seal the connection of the two liners.

12 Claims, 2 Drawing Sheets

(56) References Cited

U.S. PATENT DOCUMENTS

| | | | |
|---|---|---|---|
| 8,375,972 B2* | 2/2013 | Kiest, Jr. | 137/15.09 |
| 2002/0157784 A1* | 10/2002 | Kiest, Jr. | 156/287 |
| 2004/0020544 A1* | 2/2004 | Kamiyama et al. | 138/98 |
| 2007/0284872 A1* | 12/2007 | Pionetti | 285/55 |
| 2009/0095355 A1* | 4/2009 | Kiest, Jr. | 137/15.01 |
| 2010/0012213 A1* | 1/2010 | Kamiyama et al. | 138/97 |
| 2010/0288392 A1* | 11/2010 | Kubel | 138/153 |
| 2011/0203719 A1* | 8/2011 | Kiest, Jr. | 156/94 |
| 2011/0220232 A1* | 9/2011 | Odell et al. | 138/98 |
| 2011/0277864 A1* | 11/2011 | Kiest, Jr. | 138/98 |
| 2012/0183358 A1* | 7/2012 | Kiest, Jr. | 405/184.1 |

* cited by examiner

METHOD FOR CREATING A SEAL BETWEEN PIPE LINERS

CROSS-REFERENCE TO RELATED APPLICATIONS

This application claims priority under 35 U.S.C. §119 to provisional application Ser. No. 61/348,464 filed May 26, 2010, herein incorporated by reference in its entirety.

FIELD OF THE INVENTION

The present invention relates generally to sewer pipe line repair, and more particularly to a new method for creating a seal between pipe liners such as near the junction of a sewer main pipe and a lateral pipe.

BACKGROUND OF THE INVENTION

Prior methods of repairing damaged pipe lines include moving a liner tube impregnated with a liquid material capable of curing and hardening to the position within the pipe where the damaged portion is located. The liner tube is urged in an outward radial direction into contact with the pipe line being repaired and the liquid material impregnating the liner tube is permitted to cure and harden. The liner tube forms an interior liner in the pipe for the pipe line being repaired.

On some occasions, lateral pipe lines are connected to main pipe lines. Often damage occurs at the junction between the lateral pipe line and the main pipe line. T-shaped or Y-shaped liner tubes have been utilized to fit within the junction between the lateral pipe line and the main pipe line. Liner tubes form a T-shaped or Y-shaped liner after hardening to the interior of the junction between the lateral pipe line and the main pipe line. However, the liner tube may not extend far enough into the lateral pipe to complete the repair, and therefore it is necessary to add a second liner to fully repair the lateral pipe. Here, it is necessary to overlap a second liner with the first liner to cover the entire section of damaged pipe.

In other instances, the original pipe becomes damaged after a first pipe liner has been installed. In order to cover the damaged area, a new pipe liner must be installed. This new pipe liner may be inserted so that it overlaps with the original pipe liner, ensuring that the entire damaged area is covered to help avoid the potential for groundwater leaks.

One problem with the methods described above is that the liners are generally not a single unit, and therefore will not bind together. Further, there may be a plastic coating as well as fats, oils, or grease on the first liner, further limiting the ability of the two liners to bind together. In the event that there is any binding, such binding will merely be surface binding, and will be subject to creep, expansion and contraction, and shrinkage between the thermoset resins. One further problem with the current methods is that ground water outside the lateral pipe line and the main pipe line infiltrates through the damaged portion of the pipe line and migrates in the interface between the two liners to a point where it can enter the pipe line.

Therefore, a primary object of the present invention is the provision of an improved method for repairing pipe using multiple pipe liners.

A further object of the present invention is the provision of a method for repairing a pipe where a damaged portion of the pipe extends further than a single liner.

A further object of the present invention is the provision of a method for repairing damaged pipe extending from where a first pipe liner that has already been installed in the host pipe is positioned.

A further object of the present invention is the provision of a method for repairing pipe using a compressible seal between a first pipe liner and a second pipe liner.

A further object is the provision of a method for repairing pipe using a hydrophilic or hydrophobic material between two liners that expands to provide a water tight seal between first and second overlapping liners.

BRIEF SUMMARY OF THE INVENTION

According to one aspect of the present invention, a method of repairing a pipe line is provided. The method includes taking a first liner, and applying a resinous material capable of curing and hardening to the first liner. At least a portion of the first liner is positioned in the pipe line. The resinous material applied to the first liner is allowed to cure and harden. The method further includes taking a second liner and applying a resinous material capable of curing and hardening to the second liner. At least a portion of the second liner is positioned in the pipe line so as to overlap with the first liner, and a sealing member is disposed between the first and second liners at the location of the overlap. Finally, the resinous material applied to the second liner is allowed to cure and harden.

According to another aspect of the present invention, a method of repairing a pipe line having a first liner therein is provided. The method includes taking a second liner and applying a resinous material capable of curing and hardening to the second liner. At least a portion of the second liner is positioned in the pipe line so as to overlap with the first liner, and a sealing member is disposed between the first and second liners. The resinous material applied to the second liner is then allowed to cure and harden.

According to yet another aspect of the present invention, a method of repairing at least a portion of a lateral pipe and a pipe junction between the lateral pipe and a main pipe is provided. The method includes taking a main/lateral lining assembly, and positioning the main/lateral lining assembly about the pipe junction with a portion of the main/lateral liner assembly disposed in the lateral pipe. A lateral liner is provided, and a resinous material capable of curing and hardening is applied to the lateral liner. At least a portion of the lateral liner is positioned in the pipe line so as to overlap with the portion of the main/lateral liner assembly in the lateral pipe with a sealing member disposed there between. The resinous material applied to the lateral liner is then allowed to cure and harden.

According to another aspect of the present invention, a method of repairing at least a portion of a lateral pipe in fluid communication with a main pipe through a pipe junction, the lateral pipe having a first liner extending within the lateral pipe from the pipe junction is provided. The method includes taking a second liner and applying a resinous material capable of curing and hardening to the second liner. At least a portion of the second liner is positioned in the lateral pipe so as to overlap with a portion of the first liner with a sealing member disposed there between. The resinous material applied to the second liner is then allowed to cure and harden.

DETAILED DESCRIPTION OF THE PREFERRED EMBODIMENTS

Figure 1:
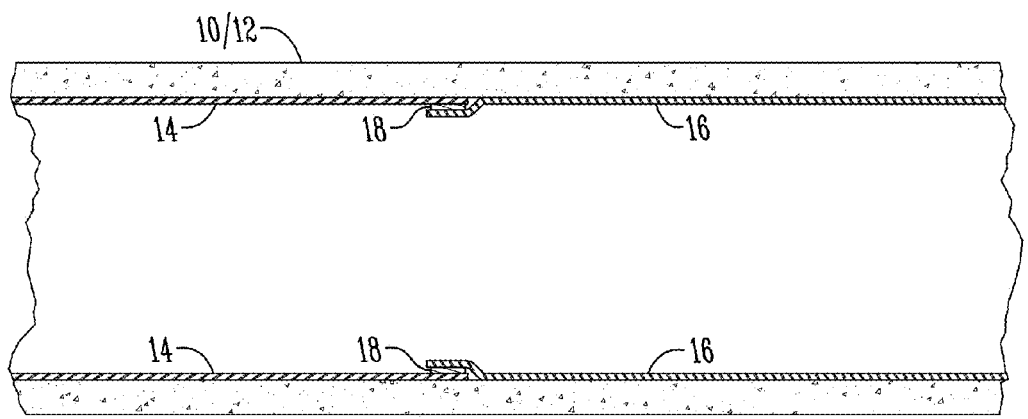
FIG. 1 is a cutaway view of a section of pipe repaired according to one embodiment.
Figure 2:
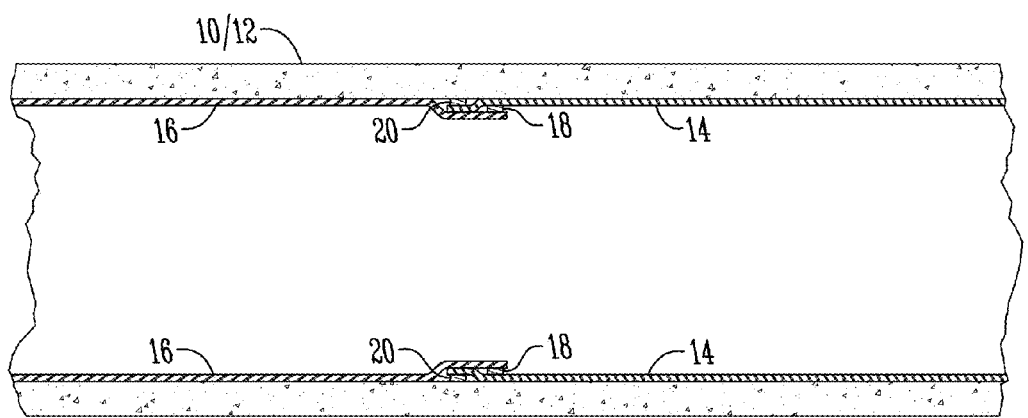
FIG. 2 is a cutaway view of another section of pipe repaired according to an alternative embodiment.
Figure 3:
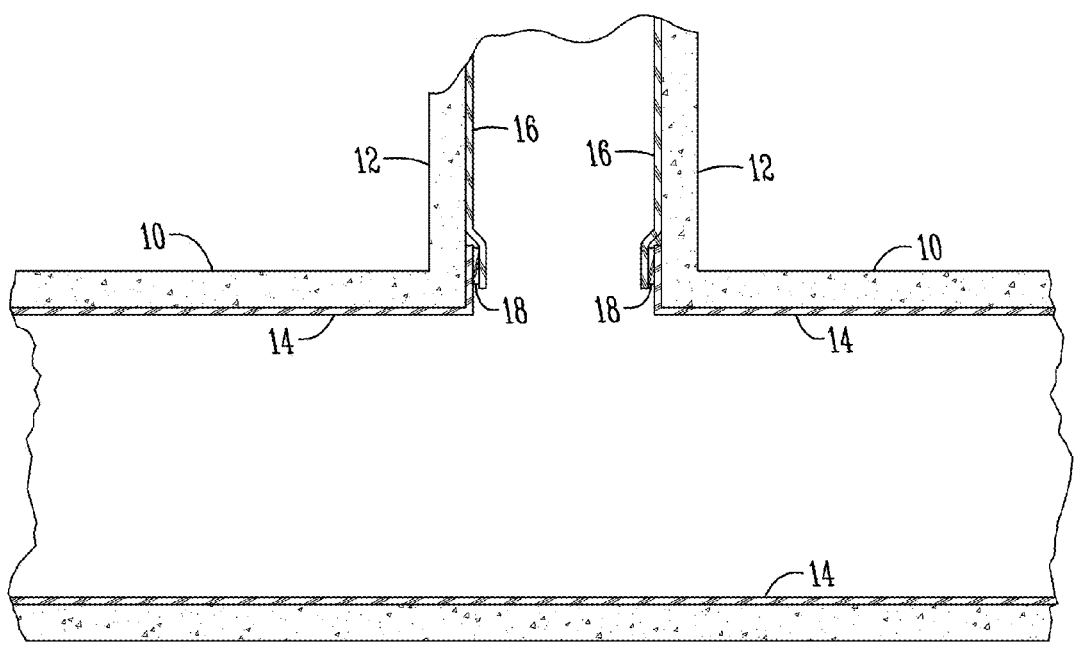
FIG. 3 is a cutaway view of a pipe tee junction repaired according to an alternative embodiment.

Referring to FIGS. 1-3, a repair assembly is generally shown in the context of a straight length of pipe or pipe junction that is to be repaired. The straight length of pipe is generally either a main line 10 or a lateral line 12. The pipe junction generally consists of a main line 10 and a lateral line 12 joining the main line 10 at approximately a right angle. The main 10 and lateral 12 lines may also be joined at an angle other than a right angle, thereby forming a Y-shaped pipe junction.

One embodiment of the present method is illustrated in FIG. 1, which involves installing two or more overlapping pipe liners to a straight length of pipe, which may be either a main 10 or lateral 12 line. According to this embodiment, the first pipe liner 14 is installed, for example, in a manner described in U.S. Pat. No. 6,994,118, herein incorporated by reference in its entirety. Once the first pipe length has been cured in place, a compressible sealing member or hydrophilic band 18 is installed into the interior of the second liner 16 near the end of the liner. As the second liner 16 is moved during the installation process, the second liner 16 is inverted so that the hydrophilic band 18 is placed on the exterior of the second liner. This hydrophilic band 18 is positioned so as to contact the first liner 14, as shown in FIG. 1. The hydrophilic band 18, such as described in the '118 patent, may expand when in the presence of water or by a chemical reaction, thereby forming a watertight seal between the first and second liners. It should be appreciated that the thickness of the liners 14, 16 and the band 18 are enlarged in the Figures to show the placement of the components. In practice, the thicknesses will be much smaller so as to create a generally seamless transition from one liner to the other.

An alternative embodiment of the present invention involves installing a pipe liner adjacent to a previously installed pipe liner, which may or may not include a hydrophilic sealing band 20 between the first liner 14 and the host pipe 10/12, as shown in FIG. 2. In this embodiment, the interior surface of the first pipe liner 14 is preferably cleaned in order to remove dirt, fats, grease, or other deposits and present a clean face for the second liner 16. As with the previous embodiment, the second liner is installed with a hydrophilic band 18 or other compressible sealing member positioned so as to contact the first pipe liner 14 when the second pipe liner 16 is inverted so as to contact the pipe 10/12. This watertight seal will prevent groundwater from seeping between from the newly installed second liner 16 to the first liner 14.

Another alternative embodiment of the present invention involves a different method of installing the second liner 16 in the pipe 10/12. According to this embodiment, rather than inverting the second liner 16, the second liner 16 is pushed or pulled into the pipe and inflated using a bladder or fitted to the inside of the pipe 10/12 using other well known means in the art. The second liner 16 preferably includes a compressible seal 18, such as a hydrophilic band, about the exterior of the liner that is positioned to contact the portion of the first liner 14 where the second liner 16 overlaps the first liner 14. According to this embodiment, the seal 18 between the first 14 and second 16 liners is ensured to be water tight and prevent groundwater from leaking through the joint formed between the first 14 and second 16 liners.

In the embodiments described above, the preferred compressible seal is a pre-formed hydrophilic band or gasket, as described in U.S. Pat. No. 6,994,118 or U.S. Patent Publication No. 2009/0056823, which are incorporated by reference in their entirety. An alternative is to use the hydrophilic or hydrophobic materials as disclosed in the U.S. application Ser. No. 12/710,113, the contents of which are also incorporated by reference in their entirety.

Here, the hydrophilic or hydrophobic material is applied to the interior of the first liner 14 once the resinous or liquid material impregnated in the first liner has cured. This may be performed either to a newly installed liner or to an existing liner. Once the hydrophilic or hydrophobic material has been applied to the first liner 14, the second liner 16 is inverted, pushed, pulled, or otherwise brought into overlapping contact with the first liner 14 so as to engage the hydrophilic or hydrophobic material 18. The hydrophilic or hydrophobic material 18 creates a water impervious seal between the first cured liner 14 and the second cured liner 16. The seal increases the strength and life of the repaired pipe 10/12 by preventing water or other liquids from penetrating behind and between the liners.

Another alternative embodiment of the present invention involves the installation of a pipe liner to a pipe junction as illustrated in FIG. 3. According to this embodiment, the pipe junction is damaged and otherwise requires a liner. A Y- or T-shaped liner, such as that described in U.S. Pat. No. 6,994,118, is installed in the area of the pipe junction between a main line 10 and lateral line 12. The liner 14 extends along the main line 10 and a portion extends at least partially into the lateral line 12. A second liner 16 is then inverted into the lateral line 12 toward the junction to overlap the portion of the first liner 14 extending from the main line 10 into the lateral line 12. The second liner 16 either includes a compressible seal 18 or a hydrophilic or hydrophobic material applied to the interior end of the second liner 16 before the second liner 16 is installed, as described in the above embodiments. Alternatively, the second liner 16 may be installed from an access point in the main pipe 10. As yet another alternative, a junction liner may be installed after the lateral liner has been installed, with a seal formed between the lateral liner and the line junction liner.

Those having skill in the art will recognize that other variations of the above described methods will be apparent. The above described embodiments are intended to be illustrative rather than limiting, and other variations are within the scope of the invention. The invention shall only be limited to those claims which are allowed.

What is claimed is:

1. A method of repairing a straight length of pipe line comprising:

taking a first liner;

applying a resinous material capable of curing and hardening to the first liner;

positioning at least a portion of the first liner in the straight length of pipe line;

allowing the resinous material applied to the first liner to cure and harden;

taking a second liner;

applying a resinous material capable of curing and hardening to the second liner;

inverting at least a portion of the second liner in the straight length of pipe line so as to overlap with the first liner with a hydrophilic or hydrophobic sealing member disposed about a circumferential interior of the first liner between the overlapped portion of the first and second liners;
securing the hydrophilic or hydrophobic sealing member to the circumferential interior of the first liner before the inverting step;
allowing the resinous material applied to the second liner to cure and harden; and
wherein hydrophilic or hydrophobic sealing member comprises a material different than the first and second liners and provides a watertight seal between the portions of the first and second liners.

2. The method of claim 1 wherein the sealing member is a hydrophilic band.

3. The method of claim 1 wherein the sealing member is connected to the second liner prior to positioning the second liner in the straight length of pipe line.

4. The method of claim 1 wherein the sealing member is applied to an interior of the second liner prior to positioning the second liner in the straight length of pipe line.

5. A method of repairing a straight length of pipe line having a first pipe liner therein, the method comprising:
taking a second liner;
applying a resinous material capable of curing and hardening to the second liner;
inverting at least a portion of the second liner in the straight length of pipe line so as to overlap with the first liner with a hydrophilic or hydrophobic sealing member disposed about a circumferential interior of the first liner between the first and second liners;
securing the hydrophilic or hydrophobic sealing member to the circumferential interior of the first liner before the inverting step;
allowing the resinous material applied to the second liner to cure and harden; and
wherein hydrophilic or hydrophobic sealing member comprises a material different than the first and second liners and provides a watertight seal between the portions of the first and second liners.

6. The method of claim 5 wherein the sealing member is a hydrophilic band.

7. A method of repairing at least a portion of a lateral pipe and a pipe junction between the lateral pipe and a main pipe, the method comprising:
taking a main/lateral lining assembly;
positioning the main/lateral lining assembly about the pipe junction with a portion of the main/lateral liner assembly disposed in the lateral pipe;
taking a lateral liner;
applying a resinous material capable of curing and hardening to the lateral liner;
inverting at least a portion of the lateral liner in the pipe line so as to overlap with the portion of the main/lateral liner assembly in the lateral pipe substantially about a circumferential interior of the main/lateral liner assembly with a hydrophilic or hydrophobic sealing member disposed there between;
securing the hydrophilic or hydrophobic sealing member to one of the main/lateral lining assembly and the lateral liner before the inverting step;
allowing the resinous material applied to the lateral liner to cure and harden; and
wherein hydrophilic or hydrophobic sealing member comprises a material different than the first and second liners and provides a watertight seal between the portions of the first and second liners.

8. The method of claim 7 wherein the sealing member is a hydrophilic band.

9. The method of claim 7 wherein the sealing member is connected to the lateral liner prior to positioning the lateral liner in the lateral pipe.

10. The method of claim 7 wherein the sealing member is applied to an interior of an end of the lateral liner prior to positioning the lateral liner in the lateral pipe and overlapping on the portion of the main/lateral liner assembly disposed in the lateral pipe.

11. The method of claim 7 wherein the sealing member is disposed near the pipe junction.

12. A method of repairing at least a portion of a lateral pipe in fluid communication with a main pipe through a pipe junction, the lateral pipe having a first liner tube extending within the lateral pipe from the pipe junction, and the method comprising:
taking a second liner tube;
applying a resinous material capable of curing and hardening to the second liner tube;
inverting at least a portion of the second liner tube in the lateral pipe line so as to overlap with a portion of the first liner tube about a circumferential interior of the first liner tube with a hydrophilic or hydrophobic sealing member disposed there between;
securing the hydrophilic or hydrophobic sealing member to one of the first liner tube and the second liner tube before the inverting step;
allowing the resinous material applied to the lateral liner to cure and harden; and
wherein hydrophilic or hydrophobic sealing member comprises a material different than the first and second liners and provides a watertight seal between the portions of the first and second liners.

\* \* \* \* \*